(12) United States Patent
Sobey

(10) Patent No.: US 6,504,662 B2
(45) Date of Patent: Jan. 7, 2003

(54) APPARATUS FOR MEASURING AND CHARACTERIZING THERMAL ASPERITIES IN A MASS DATA STORAGE DEVICE

(75) Inventor: Charles H. Sobey, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/753,322

(22) Filed: Dec. 28, 2000

(65) Prior Publication Data

US 2002/0085298 A1 Jul. 4, 2002

(51) Int. Cl.[7] .................................................. G11B 5/02
(52) U.S. Cl. .............................. 360/25; 360/53; 360/31
(58) Field of Search .............................. 360/25, 53, 46, 360/31; 324/210, 212, 226; 369/53.1, 53.44, 53.41

(56) References Cited

U.S. PATENT DOCUMENTS

| 5,416,432 A | | 5/1995 | Lewis |
| 5,537,034 A | * | 7/1996 | Lewis ........................ 360/72.1 |
| 5,822,139 A | * | 10/1998 | Ayabe ......................... 360/31 |
| 5,838,514 A | * | 11/1998 | Smith et al. .................. 360/75 |
| 6,163,419 A | | 12/2000 | Sobey |

OTHER PUBLICATIONS

Shariatdoust, et al., "An Integrating Servo Demodulator for Hard Disk Drives", IEEE 1993 cus. Integ. Cir. Conf., pp. 10.6.1–5, 1993.

Hempstead, "Thermally Induced Pulses in Magnetoresistive Heads", IBM J. Res. Develop., pp. 547–550, 11/74.

Galbraith et al., "Magneto–Resistive Head Thermal Asperity Digital Compensation", IEEE Trans. on Magnetics, vol. 28, No. 5, pp. 2731–2732, 9/92.

Nagaraj et al., "A Median Peak Detecting Analog Signal Processor for Hard Disk Drive Servo", IEEE J. S. St. Cir., vol. 30, No. 4 pp. 461–470, 4/95.

Klaassen, et al., "Electronic Abatement of Thermal Interface in (G)MR Head Output Signals", IEEE Tr. on Mag., vol. 33, No. 5, pp 2611–2616, 9/97.

Stupp, et al., "Thermal Asperity Trends", Jun. 30, 1998.

SSI 32R1606AR TI Data Sheet, Total Solutions 1999 Data CD–ROM, p. 3–16.

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

A method and apparatus for characterizing a magnetic disk (40) of the type that contains data to be read by a magneto-resistive type head (18) in proximity thereto is disclosed. The method includes writing a continuous signal onto the disk, and reading back the signal written onto the disk (40) using the magneto-resistive type head (18). The read back signal is compared to a threshold value (58), and areas of said disk at which energy contained in said read back signal occurs above said threshold value (54) are mapped. The energy content is measured by accumulating oversampled signal values from the read back signal during a time at which said read back signal exceeds the threshold value (58).

25 Claims, 3 Drawing Sheets

APPARATUS FOR MEASURING AND CHARACTERIZING THERMAL ASPERITIES IN A MASS DATA STORAGE DEVICE

BACKGROUND OF THE INVENTION

1. Field of the Invention

This invention relates to improvements in manufacturing and operating techniques for mass data storage devices, and the like, and more particularly to improvements in methods and apparatuses for reducing the effects of thermal asperities of an MR read head, or the like, in a signal read back from a rotating magnetic disk of a mass data storage device, or the like.

2. Relevant Background

Mass data storage devices include tape drives, as well as hard disk drives that have one or more spinning magnetic platters or disks onto which data is recorded for storage and subsequent retrieval. Hard disk drives may be used in many applications, including personal computers, set top boxes, audio, video, or television applications, or some mix thereof. Many applications are still being developed. Applications for hard disk drives are increasing in number, and are expected to further increase in the future.

One class of mass data storage devices to which the present invention has particular applicability is hard disk drive systems. A hard disk drive system typically includes a rotating magnetic disk on which information is recorded. A read transducer is movably supported adjacent the magnetic disk for reading the prerecorded information from the disk. The read transducer typically flies above the surface of the disk, being supported by an "air bearing" that is created by the spinning disk, so that the transducer does not touch the surface of the disk in normal operation.

Recently, magnetoresistive (MR) heads have been gaining wide popularity for use as the read transducer. The term "magnetoresistance" refers to the change in resistivity of the materials of the head in the presence of the magnetic field induced in the head by the magnetic domains recorded on the disk. The introduction of MR heads into disk drives has significantly increased the a real density. However, accompanying the MR head is the problem of thermal asperity disturbances, which can cause unrecoverable errors.

A thermal asperity disturbance results when a metal particle, disk defect, or the like nearly or actually collides with the MR head, momentarily raising the temperature of the sensor. The heat conducted into the MR sensor subsequently diffuses slowly. This rapid rise in temperature changes the MR resistance and results in a voltage transient. When superimposed on the normal read back signal, the resultant shape shows a rapid rise in voltage followed by an exponential-like decay.

Similarly, if a dip in the disk exists that has the effect of increasing the air-bearing gap between the MR head and disk surface, a decrease in the cooling effect may occur in the MR head. The resulting change in resistance of the MR head material is the same as that produced by the head heating effects described above.

If the disk surface or an asperity momentarily comes closer to the MR read element without touching it an increase in the cooling effect may occur in the MR head. The resulting change in resistance of the MR head material is the same as that produced by the head heating effects described above, but in the opposite direction.

Heating and cooling effects due to the texture of the medium surface are a class of thermal asperity, sometimes known as a "baseline wander" type of event. Herein both heating and cooling type events are referred to as "thermal asperities".

Many efforts have been directed to reducing the effects of thermal asperities. Physically, efforts have been made to reduce the flash temperature that results from a collision between the head and the disk or a defect thereon. The flash temperature can be reduced by reducing the dynamic friction, the slider dimensions, and the interaction height. The latter requires smoother disks, fewer "glide escapes", lower particle count and less contamination and debris. The industry trends of lowering the flying heights and increasing the slider-disk velocities however more than offset any improvements that can be expected from these countermeasures.

Other physical measures have been taken, as well, including designing the heads to have a high magnetic sensitivity, a low effective temperature coefficient, and a wide track width. Some proposals even include using a second, dummy sensor away from the air-bearing surface of the main sensor to provide a reference against which the output of the main sensor can be compared. Differentially sensed dual stripe heads were also used to partially cancel the thermal asperity effects. Other physical measures have been taken, as well.

In addition to the physical measures, electronic compensation measures in the read channel of the device have also been taken. Both "on-the-fly" and "re-try" types of counter measures have been advanced to lessen the impact of the thermal asperity effects. The on-the-fly methods in include "cloaking" methods in which the analog channel front-end processes the thermal asperity events such that they become invisible to the rest of the channel. The re-try methods include recovery steps that are implemented at the system level as part of a data recovery procedure.

In any event, the detection that a thermal asperity event has occurred is of importance. Many techniques for such detection have been advanced. In one technique, a flag is generated that signals that a thermal asperity event is occurring. In another technique, onset/magnitude detectors are used, sometimes in combination with a circuit or signal processor that subtracts predetermined electronically generated thermal asperity waveforms from the data signal.

One type of detector that has been used is a window detector, which detects the onset of a thermal asperity event as indicated by a rising edge in the output at the moment at which the input signal rises above or falls below a certain threshold. Another type detector is the envelope zero-crossing detector, which compares the positive signal envelope, the baseline, and the negative envelope. Envelope detectors rapidly follow a fast rising signal, but discharge slowly when following a falling signal.

To recover from the occurrence of a thermal asperity event, waveform-recovering detectors have been used in direct electronic restoration schemes that subtract the recovered event from the incoming data signal. Such event detectors must be fast and accurate.

Regardless of the manner by which the thermal asperity event is detected, however, the information that is obtained by previous techniques has been used to map the disk of the drive, and more particularly, to map areas of the drive that are affected by the thermal asperities thereon.

However, such information has been generally insufficient to map the drive in relation to the severity of the thermal asperity effects produced in the system. Such detailed map, according to the present invention, can be used, for example, to characterize the drive to particularly identify unusable areas thereof, and can, more particularly, be used to characterize the individual thermal asperities that occur during use of the disk so that regions of the disk can be evaluated depending upon the nature of the thermal asperities that occur within various regions of the disk.

What is needed, therefore, is a method for testing and mapping a disk drive surface for the existence of thermal asperity incident creating structures, imperfections, debris, or the like, to thereby enable thermal asperity abatement settings to be selectively tailored or adjusted to individualize the compensation needed for each particular identified thermal asperity causing structures, imperfections, debris, or the like. Furthermore, this characterization information can be fed back into the disk manufacturing and handling processes to help fine-tune, refine, improve, and control these processes.

SUMMARY OF THE INVENTION

In light of the above, therefore, it is an object of the invention to provide a method for testing and mapping a disk drive surface for the existence of thermal asperity incident creating structures, imperfections, debris, or the like.

It is another object of the invention to provide a method of the type described that enables thermal asperity abatement settings to be selectively tailored or adjusted to individualize the compensation needed for each particular identified thermal asperity causing structure, imperfection, debris, or the like.

It is yet another object of the invention to provide a method of the type described that enables a greater surface area of the disk of a disk drive to be used through the identification and mapping of areas of the disk that produce thermal asperity effects in an MR head that are within the capabilities of the detector of the drive to correct.

One of the advantages realized by the invention is the ability to characterize the thermal asperity causing structures enables the development of information that can be fed back into the disk manufacturing and handling processes to help fine-tune, refine, improve, and control these processes.

These and other objects, features and advantages of the invention will be apparent to those skilled in the art from the following detailed description of the invention, when read in conjunction with the accompanying drawings and appended claims.

According to a broad aspect of the invention, a method is presented for operating a drive of a hard disk drive, or the like, of the type that uses a head that flies over a surface of a rotating magnetic disk to at least read information recorded on the disk. The head is of the type that is affected by thermal asperity effects, such as a magneto-resistive (MR) head, or the like. The method includes determining an energy level in a prerecorded constant signal that is produced on readback that exists above a predetermined threshold produced by the head in reading an area of the disk that causes a thermal asperity incident in the head. (A continuous signal means a single frequency pattern or sequence written to the disk.) Based on the energy level determined, an unusable area of the disk may be determined.

According to another broad aspect of the invention, a method is presented for characterizing a magnetic disk to be read by a magneto-resistive type head in proximity thereto. The method includes writing a continuous signal onto the disk, and subsequently reading back the signal written onto the disk using the magneto-resistive type head, or the like. The read back signal is compared to a threshold value, and areas of the disk at which energy contained in the read back signal occurs above the threshold value are mapped.

According to still another broad aspect of the invention, apparatus for characterizing a disk of a mass data storage device, or the like, is presented. The apparatus is of the type that has a head that flies over a surface of a rotating magnetic disk, or the like, to at least read information, which has been recorded on the disk. The head is of the type that is affected by thermal asperity effects, such as an MR head, or the like. A threshold detector is connected to receive a signal from the head to determine when the signal from the head exceeds a predetermined threshold. An energy detector determines an energy level in the signal during a time when the signal exceeds the threshold due to the thermal asperity incident in the head.

According to yet another broad aspect of the invention, an apparatus for characterizing a magnetic disk of the type that contains data to be read by a magneto-resistive type head in proximity thereto is presented. The apparatus has a writer for writing a continuous signal onto the disk and a comparator for comparing a signal read back from the disk using the magneto-resistive type head with a threshold value. An energy determining circuit determines an energy level contained in the read back signal during a time that the read back signal exceeds the threshold value and for mapping areas of the disk at which the energy level contained in the read back signal exceeds the threshold value. A register contains the mapped areas of the disk.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
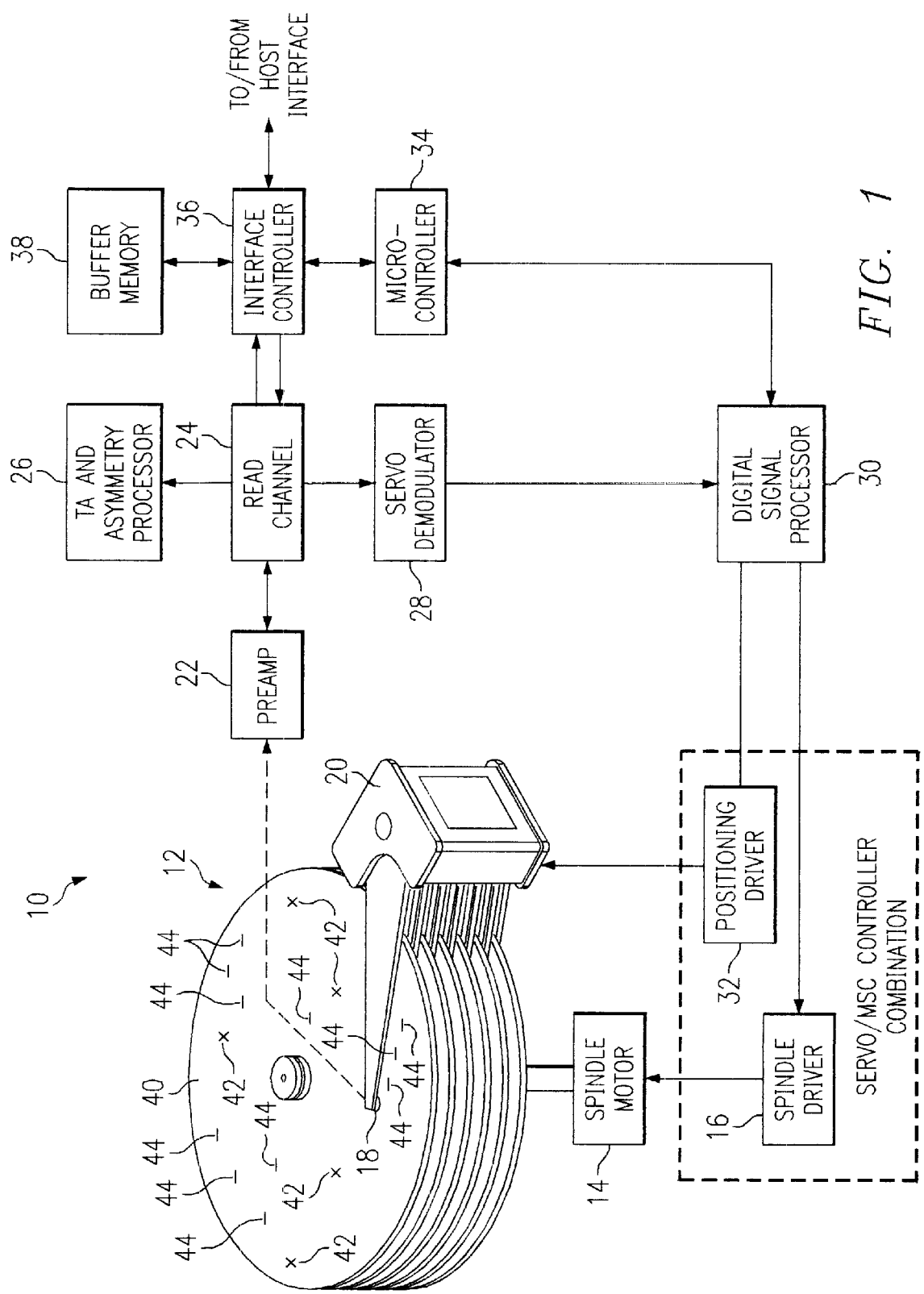
FIG. 1 is a block diagram of a generic disk drive system, illustrating one general environment in which the invention may be practiced.

FIG. 1 is a block diagram of a generic disk drive system 10, which represents one general environment in which the invention may be practiced. The circuit 10 represents the method and apparatus for practicing the invention in which thermal asperities (TAs) may be detected during the disk manufacturing characterization process of a mass data storage device.

The system 10 includes a magnetic media disk stack 12 that is rotated by a spindle motor 14 and spindle driver circuit 16. A data transducer or head 18 is locatable along selectable radial tracks (not shown) of the disk stack 12 by a voice coil motor 20. The radial tracks may contain magnetic states that contain information about the tracks, such as track identification data, location information, synchronization data, as well as user data, and so forth. The head 18, which may be a magneto-resistive (MR) head, is used to both record user data to and read user data back from the disk. The head 18 may also be used to detect signals that identify the tracks and sectors at which data is written, to detect servo bursts that enable the head to be properly laterally aligned with the tracks of the disk, and so on.

Analog electrical signals that are generated by the head 18 in response to the magnetic signals recorded on the disk are preamplified by a preamplifier 22 for delivery to read channel circuitry 24 and to a thermal asperity (TA) and asymmetry processing circuit 26. Servo signals are detected and demodulated by one or more servo demodulator circuits 28 and processed by a digital signal processor (DSP) 30 to control the position of the head 18 via a positioning driver circuit 32.

A microcontroller 34 may be provided to control the DSP 30, as well as an interface controller 36 to enable data to be passed to and from a host interface (not shown) in known manner. A data memory 38 may be provided, if desired, to buffer data being written to and read from the disk.

As known, each disk of the disk stack 12 may include particles or defects, which temporarily or permanently produce TA incidents. For example, the top disk 40 may have a number of imperfections 42, indicated by an "X", which may be randomly located on the surface of the disk 40 over which the head 18 travels. The defects 42 may be protruding bumps or may be dips in the surface, which respectively may collide with or approach the head 18 as it travels thereover, or may increase the air bearing distance between the surface of the disk and the head. The bumps increase the temperature of the head 18, and therefore increase its electrical resistance.

As disks are characterized for TAs, certain energy characteristics may be found to distinguish TAs that move or grow, such as those due to corrosion, from those that do not move or grow. (Typically, it is desirable to map out more of the disk around TAs that are due to corrosion, since they have a tendency to grow.) However, without characterization, every TA may be assumed to be one that will grow. On the other hand, with characterization, less disk surface must needlessly be mapped out. Thus, it can be seen that it would be useful to be able to characterize the TA incidents that such permanent TA incident producing defects produce.

The disk 40 may also carry particles 44, indicated by a "-", which only temporarily produce a TA incident. The particles 44 may be, for example, dust, manufacturing debris, or other particles that are not permanently included in the surface of the disk 40. It is widely believed that particles 44 tend to migrate over time toward the outer edge of the disk 40, and that as a result, more particles tend to exist at the outward portions of the disk 40 than in the interior portions. Often, the particles are entirely spun off the disk 40. With this type of TA incident producing particles, it can be seen that the location of each particle, and even the existence of any particular particle on the disk, cannot be relied upon from one time to the next. Nevertheless, it may be useful to be able to map the particles, and additionally, to characterize the TA incident that each particle may precipitate.

According to a preferred embodiment of the invention, a constant frequency signal is recorded throughout all of the tracks of the disk 40. The signal may be, for example, a continuous EPR4 signal representing a non-overlapping sine wave. More particularly, herein a "continuous signal" is used to indicate a single frequency pattern or sequence to be written to the disk.

Subsequently, the recorded signal is read back, and the TA incidents that are produced by each defect, particle, or other TA precipitating structure are identified when the read back signal exceeds a predetermined signal threshold. Additionally, the TA precipitating structures may be characterized by the amount of signal energy that is produced during the time that the read back signal exceeds the predetermined signal threshold.

Figure 2:
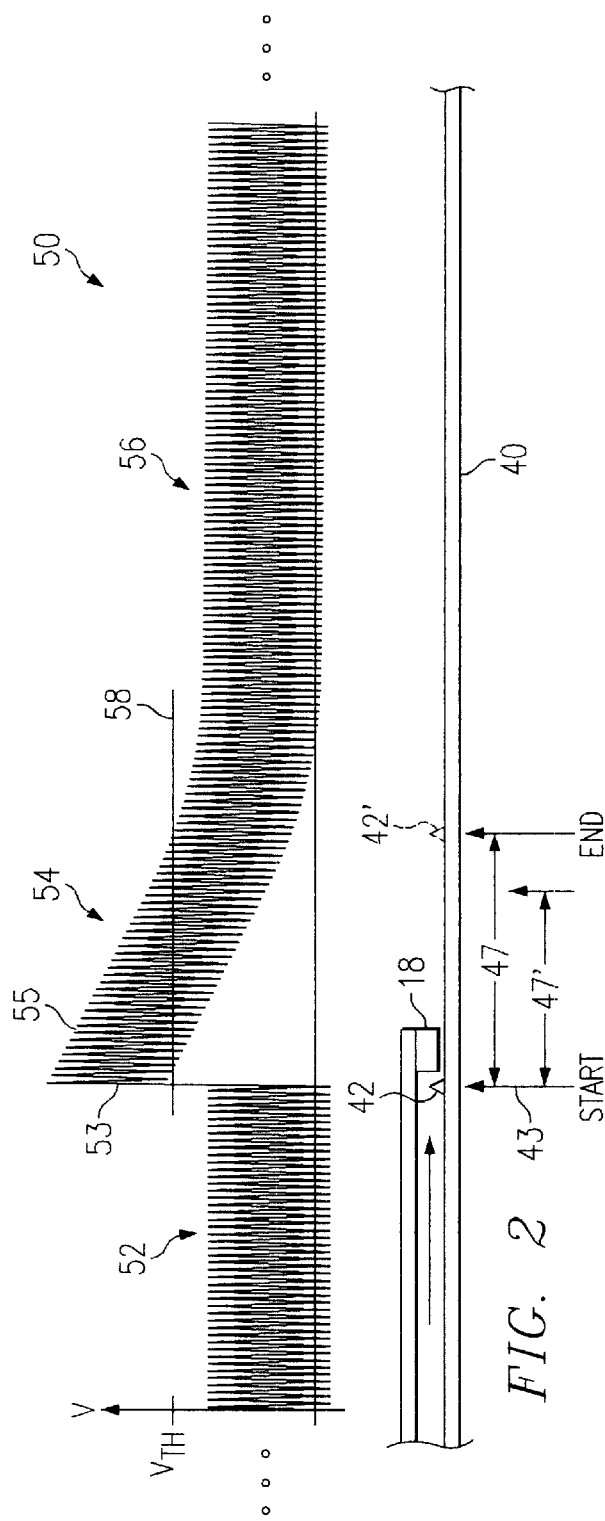
FIG. 2 is a typical voltage vs. time waveform for a read back signal at the output of the preamplifier and which is experiencing a positive TA incident, together with a cross sectional view of a portion of a disk with a TA producing defect thereon in positional relationship to the read back signal waveform.

A typical waveform showing voltage vs. time for a read back signal 50 at the output of the preamplifier 22 in a system which is experiencing a positive TA incident is shown in FIG. 2, to which reference is now additionally made. As can be seen, the leftmost portion 52 of the signal 50 is of relatively constant amplitude. When the MR head 18, for example, strikes one of the TA producing defects 42 (or 44) on the surface of the disk 40, the resistance of the head 18 increases, resulting in a jump in the corresponding voltage from the preamplifier there across, as shown by the signal portion 54. After the defect has passed, and as the head cools, the resistance begins to normalize, resulting in the slow decay of voltage back to normal. Thereafter, the voltage 56 remains at its normal, original voltage level. It should be noted that the same analysis can be made for a thermal asperity of the type in which cooling of the MR head occurs. In such analysis, the jump in signal would be negative, rather than positive, as shown.

Figure 3:
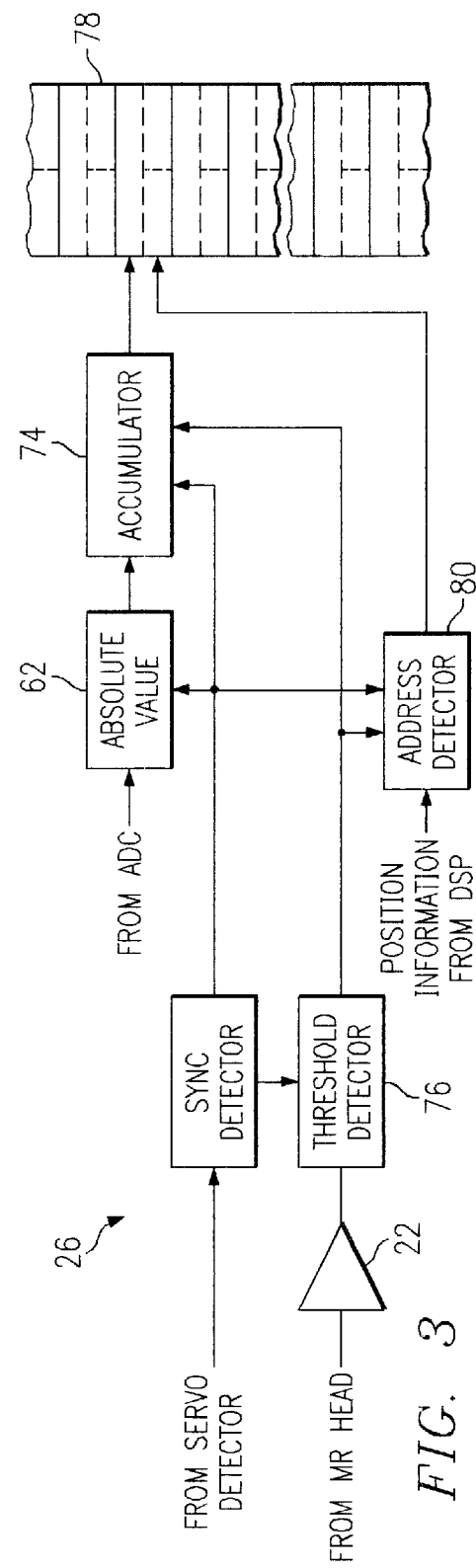
FIG. 3 is a block diagram of a circuit for determining the energy contained in a read back signal during the time the read back signal is above a predetermined threshold value, in accordance with a preferred embodiment of the invention.

According to the invention, the energy contained in the read back signal portion 54 during the time the read back signal is above a predetermined threshold value VTH 58 is determined. This determination may be made, for example, by the integrating circuit 26 of FIG. 3, to which reference is now additionally made. The integrating circuit 26 includes an absolute value circuit 62, which has an input coupled to the output of the ADC (not shown) of the read channel 24. The absolute value circuit 62 determines and outputs the absolute value of each digital sample generated by the ADC. If the digital samples are represented by signed binary numbers, this may involve simply removing the sign bit. The absolute value circuit 62 thus operates somewhat like a full-wave rectifier circuit. The effectiveness and accuracy of this method is negatively affected when the input signal is so large that the ADC saturates.

Figure 4:
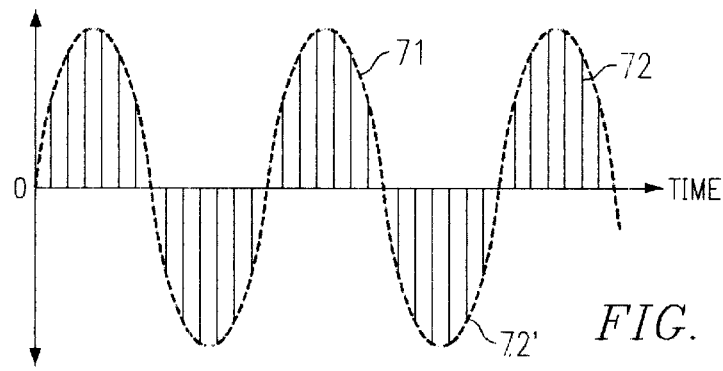
FIG. 4 is a graph of amplitude vs. time to show the output of the ADC of the read channel, shown as a pure sinusoidal waveform.
Figure 5:
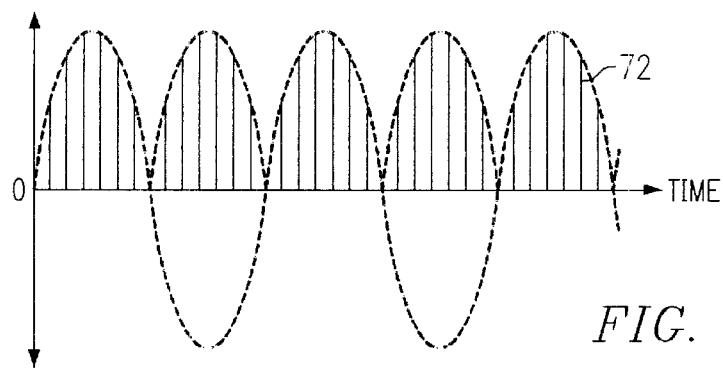
FIG. 5 is a graph of the signal of FIG. 4 after the negative samples from the ADC have been converted to positive samples.

The operation of the absolute value circuit 62 is illustrated in FIGS. 4 and 5, to which reference is now additionally made. FIG. 4 is a graph representing the output of the ADC of the read channel, where the broken line 71 represents the envelope of a burst-signal, and the solid lines 72 represent the positive and negative samples taken by the ADC. For convenience, the burst signal shown in FIG. 4 has an envelope 71 that is a pure sinusoid, although the envelope may in reality have the shape of a Lorentzian signal, or the like.

FIG. 5 shows the output of the absolute value circuit 62, after the negative samples from the ADC have each been converted to a positive sample, in order to effectively achieve full-wave rectification. As evident from FIGS. 4 and 5, the disclosed embodiment preferably utilizes sampling at or above the Nyquist rate, which means taking samples at a rate equal to or greater than twice the highest frequency contained in the signal. The sampling in the disclosed embodiment involves about twelve samples per full cycle of the burst signal, or in other words about six samples per half-cycle. Thus, the disclosed embodiment uses about twelve samples per full cycle, although it will be recognized that the specific sampling rate can be varied within the scope of the invention.

With reference again to FIG. 3, the output from the absolute value circuit 62 is supplied to an accumulator 74, which adds up successive digital values supplied to it by the absolute value circuit 67. More specifically, the accumulator 74 sums the sample values supplied to it during the time interval during which the read back signal exceeds the threshold voltage 58, determined by a threshold detector 76. Thus, the accumulator 74 essentially integrates the digital voltage values from the ADC of the read channel 24, producing a value that represents the energy contained in the read back signal during the time that the read back signal exceeds the predetermined threshold value 58. A method and circuit for such accumulation between zero crossings is shown in U.S. Pat. No. 6,163,419, issued Dec. 10, 2000, entitled METHOD AND APPARATUS FOR DEMODULATING A SERVO BURST SIGNAL IN A HARD DISK DRIVE, assigned to the assignee hereof, and incorporated herein by reference.

At the end of a time interval during which the accumulator 74 has been adding up sample values, the accumulated value or sum is transferred to a register array 78. Then, the accumulator 74 is cleared to be ready to add up samples for another time interval, in a similar fashion to that above described. As the accumulator 74 acquires each accumulated value, it is inserted into an unused register of the register array 78.

Additionally, the circuit 26 includes an address detector 80, which is triggered by an output of the threshold detector 76 to latch start and stop addresses between which the read back signal exceeds the predetermined threshold value 58. The start and stop addresses are stored in the register array 78 together with the integrated energy value computed in the accumulator 74.

Thus, once all of the thermal asperity inciting events have been traversed, not only is there a record of the locations of the events, but a record of the signal energy that accompanies each event, once the events have been initiated. This is useful information, for example, in determining the severity of the events. For instance, if a defect in the disk surface does not actually collide with the MR head, the energy that would result in the read back signal above the threshold would likely be significantly less than that produced by a defect that actually collides with the head. In addition, the pattern of defects and severity thereof may be meaningful in the design and operation of the drive on which the disk is used.

It is known that the decay portion of a TA has a generally low frequency spectral content. As a result, the waveform of the detected signal has a spike 53 at the outset followed by a slow decaying signal 55, as described above with reference to FIG. 2, to which reference is again made. Depending on the severity and longevity of the TA incident, the robust Viterbi detectors that are in wide use today may be able to detect the data, in spite of the TA incident, except, perhaps, for the initial spiked portion of the read back data.

Thus, for example, as shown in FIG. 2, the energy contained in the signal portion 54 that is above the threshold voltage 58 can be analyzed to first locate the start location 43 of the TA incident on the disk 40. In addition, the fall of the increased signal portion 54 to below the threshold 58 can locate the end 45 of the TA incident. The portion 47 of the disk 40 may then be logged as being unusable.

However, because the characteristics of the pattern written to the disk are known, and because the energy contained in the TA event above the threshold is known, it may be possible to characterize the TA incident that is caused by the defect 42 into severity classifications, such as "major", "average", "minor", and so on. Those classifications that are, for example, "minor" may be further analyzed to determine when the signal is within the processing capabilities of the Viterbi. Thus, for instance, the length of the formerly unusable portion 47 of the disk 40 for a "minor" TA producing defect may be reduced so that only a reduced portion 47' of the disk 40 can be logged as unusable. This, of course, would have the effect of increasing the usable capacity of the disk 40.

The TA identification, mapping, and characterizing process, according to one aspect of the invention is preferably used during the disk drive manufacturing processes. Thus, for example, during the manufacturing process for making the disks for use in mass data storage devices, the characterization process can be performed over the entire disk surface. One way for performing this process is illustrated in FIG. 6, to which reference is now additionally made.

Figure 6:
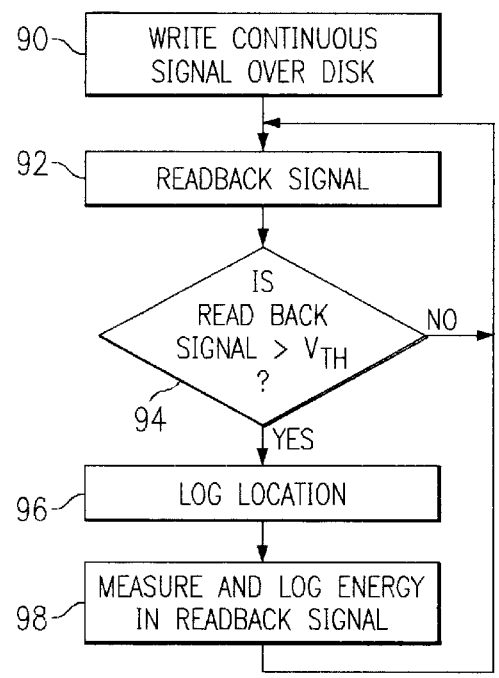
FIG. 6 is a flow chart showing a characterizing process for use in a manufacturing process for making disks for use in mass data storage devices, in accordance with a preferred embodiment of the invention.

As shown in FIG. 6, a continuous signal may be written 90 entirely over the disk. As mentioned, a continuous signal is used to mean a single frequency pattern or sequence written to the disk. Thereafter, the signal is read back 92. As the signal is read back, whenever the read back signal crosses a predetermined threshold 94, which may be due, for instance, to a TA producing defect on the disk, at least the starting location is logged 96, and the energy contained in the signal is measured and logged 98. The energy contained may be measured, for example, by oversampling the read back signal and accumulating the oversampled values using, for instance, an apparatus as described with reference to FIG. 3 above, or the like. If either the signal does not exceed the predetermined threshold or after a TA producing defect has been logged, the process is continued, as shown.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for operating a drive of the type that uses a head that flies over a surface of a rotating disk to at least read information recorded on the disk, said head being of the type that is affected by thermal asperity effects, comprising:
recording a continuous signal onto the disk;
reading back said continuous signal from said disk to produce a read back signal;
determining an energy content in said read back signal which exceeds a predetermined threshold produced by said head in reading an area of said disk that causes a thermal asperity incident in said head;
based on said energy level, determining at least one characteristic of said disk.

2. The method of claim 1 wherein said recording a continuous signal comprises recording a single frequency pattern to the disk.

3. The method of claim 1 wherein said at least one characteristic of said disk is an unusable area of said disk.

4. The method of claim 1 wherein said determining an energy content comprises accumulating sampled signal values from said read back signal during a time at which said read back signal exceeds said predetermined threshold.

5. The method of claim 4 wherein said accumulating sampled signal values comprises accumulating sampled signal values at a rate at least as great as the Nyquist rate.

6. The method of claim 1 wherein said disk is a magnetic disk.

7. The method of claim 6 wherein said head is a magneto-resistive type head.

8. The method of claim 1 further comprising reading data from said disk except from said area of said disk that is determined to be unusable.

9. A method for characterizing a magnetic disk of the type that contains data to be read by a magneto-resistive type head in proximity thereto, comprising:

writing a continuous signal onto said disk;

using said magneto-resistive type head, reading back the signal written onto said disk;

comparing the read back signal to a threshold value;

and mapping areas of said disk at which energy contained in said read back signal occurs above said threshold value.

10. The method of claim 9 wherein said writing said continuous signal comprises writing a single frequency pattern to said disk.

11. The method of claim 9 wherein said comparing comprises comparing the read back signal to a voltage amplitude threshold.

12. The method of claim 9 wherein said mapping comprises mapping areas of said disk for nonuse in dependence upon said energy contained in said read back signal that occurs above said threshold value.

13. The method of claim 9 further comprising:

determining an energy level of said read back signal while said read back signal occurs above said threshold value by:

during said reading back, sampling the read back signal, to produce a plurality of sample signals;

and during said comparing, summing said plurality of sample signals.

14. The method of claim 9 wherein said determining an energy content comprises accumulating sampled signal values from said read back signal during a time at which said read back signal exceeds said predetermined threshold.

15. The method of claim 14 wherein said accumulating sampled signal values comprises accumulating sampled signal values at a rate at least as great as the Nyquist rate.

16. Apparatus for characterizing a disk of a mass data storage device of the type having a head that flies over a surface of a rotating disk to at least read information recorded on the disk, said head being of the type that is affected by thermal asperity effects, comprising:

a continuous signal generator for generating a continuous signal to be written onto said disk;

a threshold detector connected to receive a signal read back by said head from said disk to determine when said signal from said head exceeds a predetermined threshold;

an energy detector for determining an energy level in said signal during a time when said signal exceeds said threshold due to a thermal asperity incident in said head.

17. The apparatus of claim 16 wherein said continuous signal is a single frequency pattern written to the disk.

18. The apparatus of claim 16 wherein said disk is a magnetic disk.

19. The apparatus of claim 18 wherein said head is a magneto-resistive type head.

20. The apparatus of claim 16 further comprising a circuit for excluding areas of said data from use in dependence upon said energy level determined by said energy detector.

21. Apparatus for characterizing a magnetic disk of the type that contains data to be read by a magneto-resistive type head in proximity thereto, comprising:

a writer for writing a continuous signal onto said disk;

a comparator for comparing a signal read back from said disk using said magneto-resistive type head with a threshold value;

an energy determining circuit for determining an energy level contained in said read back signal during a time that said read back signal exceeds said threshold value and for mapping areas of said disk at which said energy level contained in said read back signal exceeds said threshold value;

and a register for containing said mapped areas of said disk.

22. The apparatus of claim 21 wherein said energy determining circuit comprises a circuit for accumulating sampled signal values from said read back signal during a time at which said read back signal exceeds said predetermined threshold.

23. The apparatus of claim 22 wherein said energy determining circuit further comprises a circuit for accumulating sampled signal values at a rate at least as great as the Nyquist rate.

24. The apparatus of claim 21 further comprising:

a signal sampling circuit to sample said reading back to produce a plurality of sample signals;

and a summer to sum said plurality of sample signals.

25. The apparatus of claim 24 wherein said signal sampling circuit accumulates sampled signal values at a rate at least as great as the Nyquist rate.

* * * * *